United States Patent [19]

Orlando

[11] 4,002,954

[45] Jan. 11, 1977

[54] TRIGGER CIRCUIT

[75] Inventor: Carl Orlando, New Shrewsbury, N.J.

[73] Assignee: The United States of America as represented by the Secretary of the Army, Washington, D.C.

[22] Filed: Dec. 11, 1975

[21] Appl. No.: 639,940

[52] U.S. Cl. .............................. 318/117; 310/4 A; 75/170; 75/122.7
[51] Int. Cl.² ......................................... H02N 7/00
[58] Field of Search ........... 318/117; 310/4 R, 4 A; 75/122.7, 170; 148/11.5; 307/106–108; 354/258

[56] References Cited

UNITED STATES PATENTS

| | | | |
|---|---|---|---|
| 2,926,293 | 2/1960 | Camm et al. | 318/117 |
| 3,174,851 | 3/1965 | Buehler et al. | 75/170 |
| 3,389,314 | 6/1968 | Lewis | 318/117 |
| 3,423,608 | 1/1969 | Kerwin et al. | 318/117 X |
| 3,754,151 | 8/1973 | Clark | 310/4 A |
| 3,802,930 | 4/1974 | Brook et al. | 75/170 X |
| 3,883,885 | 5/1975 | Orlando | 354/258 |

OTHER PUBLICATIONS

55–Nitinol–The Alloy with a Memory: its Physical Metallurgy, Properties and Applications, Jackson et al., NASA, 1972.

Primary Examiner—Donovan F. Duggan
Attorney, Agent, or Firm—Nathan Edelberg; Robert P. Gibson; Jeremiah G. Murray

[57] ABSTRACT

A wire of Nitinol can be stretched up to a given amount and will remain in this stretched state until heated to a critical temperature. When heated to the critical temperature, the wire restores to its original length. When the wire restores to its original length, it exhibits a substantial tensile force and this force can be used to operate a device such as a photographic shutter operatively attached to the wire, for example. The trigger circuit of this invention provides a current pulse for the required time period to heat the Nitinol wire to its critical temperature to thereby restore the wire to its original length. The circuit includes a high power transistor which is gated on for a controlled time to provide the required power to heat the Nitinol wire to its critical temperature.

9 Claims, 1 Drawing Figure

U.S. Patent   Jan. 11, 1977   4,002,954
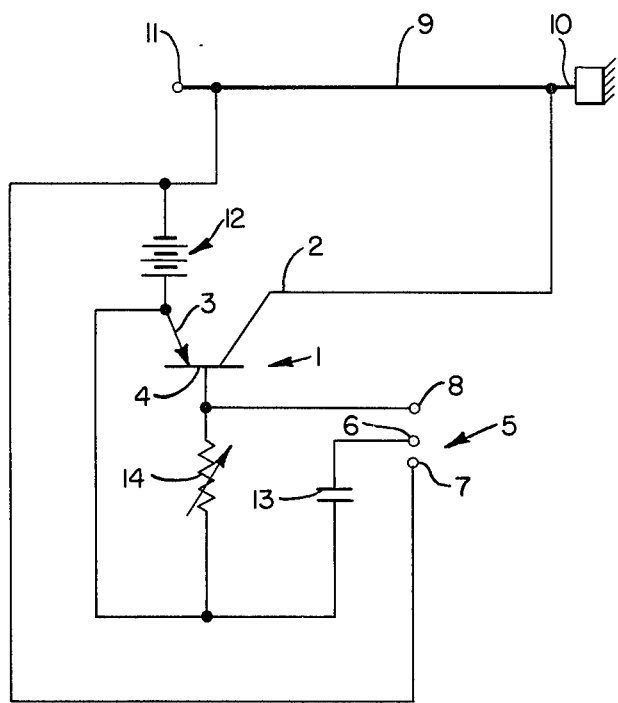

TRIGGER CIRCUIT

The invention described herein may be manufactured, used, and licensed by or for the Government for Governmental purposes without the payment to me of any royalties thereon.

BACKGROUND OF THE INVENTION

This invention relates to trigger circuits; and more particularly, to a trigger circuit designed for providing a current pulse to a 55-Nitinol wire to heat the wire to the temperature required to restore the wire to its original length from a stretched condition.

An alloy of nickel and titanium of particular stoichiometer composition that exhibits a dimensional memory has been developed. A length of wire of this alloy has the following characteristics: a given length of wire can be stretched up to (about 10 percent of its original length) but not exceeding a predetermined maximum for the alloy and when the tensile stress used to stretch the wire is removed, the wire remains at this stretched length indefinitely provided that its temperature is not elevated above its martensitic critical temperature. When the temperature of the stretched wire is elevated to the martensitic critical temperature of the alloy, the wire is substantially instantly restored to its original dimension and during restoration, the wire exhibits a substantial tensile force. In fact, when the wire restores to its original length, it exhibits a contracting force several times greater than the tensile force required to stretch the wire at its lower temperature.

If one end of a stretched Nitinol wire is fixed and the other end is free, the free end will move toward the fixed end when it is heated to its critical temperature. Thus, if a mechanism such as a photographic shutter, for example, is operatively secured to the free end of the wire, the mechanism can be operated by the force exhibited by the Nitinol wire when it is restored to its unstretched state.

A more detailed description of Nitinol wire and the use of such wire for activating photographic shutters is given in U.S. Pat. No. 3,883,885 and the entire disclosure of this U.S. Pat. No. 3,883,885 is incorporated herein by reference.

SUMMARY OF THE INVENTION

The invention is a trigger circuit for applying a current pulse to a stretched length of Nitinol wire to restore the wire to its original unstretched length. The trigger circuit comprises a high power transistor, a D.C. power supply, a variable resistor, a capacitor, a two-position switch and a length of Nitinol wire. When the two-position switch is in its first closed position, the capacitor is charged by the D.C. power supply and when the switch is in its second closed position, the capacitor is connected in parallel with the variable resistor. The variable resistor is connected to the base of the transistor, therefore, when the charged capacitor is connected across the variable resistor by the two-position switch, the transistor is turned on and a current pulse is applied to the Nitinol wire to heat the wire to its critical temperature. The duration of the current pulse is determined by the RC time constant of the parallel circuit formed by the variable resistor and the capacitor when the capacitor is connected across the variable resistor by the two-position switch. This time constant can be varied since the resistor is a variable resistor.

BRIEF DESCRIPTION OF THE DRAWING

A complete understanding of the structural details and operation of the invention can be obtained from the following detailed description when read in conjunction with the annexed drawing in which the single FIGURE shows a preferred embodiment of the invention.

DETAILED DESCRIPTION OF THE INVENTION

Referring to the single FIGURE, the transistor 1 having the collector electrode 2, the emitter electrode 3 and the base electrode 4 is a high power transistor. The switch 5 has a movable contact 6, a first stationary contact 7 and a second stationary contact 8. Movable contact 6 is movable from the open position shown in the drawing to a first position where it is closed on contact 7 and to a second position where it is closed on contact 8.

A length of Nitinol wire 9, which may be a length of 55-Nitinol as described in said U.S. Pat. No. 3,883,885, which is incorporated herein by reference, has its one end 10 fixedly secured as shown in the drawing. The other end 11 of Nitinol wire 9 is shown as being free in the drawing. As will be described later a mechanism such as a photographic shutter is operatively secured to end 11 of Nitinol wire 9. Collector 2 of transistor 1 is connected to wire 9 at or near end 11 of wire 9. The positive terminal of the D.C. power supply 12 is connected to emitter 3 of transistor 1 and the negative terminal of this power supply is connected to contact 7 of switch 5 and to wire 9 at or adjacent end 11 of wire 9.

The capacitor 13 is connected between contact 6 of switch 5 and emitter 3 of transistor 1. Contact 8 of switch 5 is connected to base 4 of transistor 1. One end of the variable resistor 14 is connected to the common point of capacitor 13 and emitter 3 of transistor 1 and the other end of the variable resistor is connected to the common point of contact 8 of switch 5 and base 4 of transistor 1.

If a tensile stress is applied to end 11 of Nitinol wire 9 to stretch wire 9 by a given amount that does not exceed a predetermined maximum for the wire and the stress is then removed, wire 9 will remain in this stretched state indefinitely. However, if wire 9 is heated to its critical temperature, for example, 140° F. for the alloy 55-Nitinol, wire 9 will return substantially instantaneously to its original unstretched length.

Assuming that wire 9 has been stretched, the trigger circuit of this invention operates in the following manner to restore wire 9 to its original length: Assuming capacitor 13 had not been previously charged, contact 6 of switch 5 is closed on contact 7 to charge capacitor 13. The closing of contact 6 on contact 7 places capacitor 13 across D.C. power supply 12 which may conveniently be a battery. After capacitor 13 is charged, contact 6 is returned to the position shown in the drawing until the circuit is to be activated to restore wire 9 to its original length. During the charging of capacitor 13, transistor 1 is not conducting. Also, when contact 6 is in the position shown in the drawing, transistor 1 is not conducting.

When wire 9 is to be restored to its original length, transistor 1 is rendered conductive by closing contact 6 of switch 5 on contact 8. When transistor 1 is conducting current flows through transistor 1 and thus through wire 9. The closing of contact 6 on contact 8 places charged capacitor 13 across variable resistor 14 and when capacitor 13 has discharged transistor 1 cuts off again. The time that transistor 1 is conductive is determined by the RC time constant of the parallel combination of variable resistor 14 and capacitor 13. Thus, when transistor 1 is rendered conductive, a current pulse, the duration of which is determined by the RC time constant of variable resistor 14 and capacitor 13 is generated by the trigger circuit and this current pulse flows through wire 9. The duration of this current pulse can be adjusted by varying variable resistor 14. This generated current pulse heats wire 9 to its critical temperature and, therefore, wire 9 restores to its original length almost instantaneously.

When wire 9 restores to its original length, it exhibits a force in the direction of secured end 10. This force is considerably greater than the force required to stretch wire 9. If a mechanism is operatively connected to end 11 of wire 9 this mechanism can be operated by the force exhibited by wire 9 when it restores to its original length. For example, a photographic shutter system could be operated by connecting the shutter to wire 9. The specific manner in which photographic shutters can be operatively coupled to Nitinol wires and operated by the restoration of such wires to their original lengths from a stretched state is disclosed in said U.S. Pat. No. 3,883,885. The trigger circuit of this invention can be used in the shutter arrangements disclosed in said U.S. Pat. No. 3,883,885. In fact, a trigger circuit of this invention can be directly substituted for each of the pulse generators shown in FIGS. 2 and 5 of U.S. Pat. No. 3,883,885. Of course, the utility of this invention is not limited to photographic shutter operation. For example, end 11 of wire 9 could be connected to a relay, the movable contact of which would be operated by the restoration of wire 9 to its original length. In fact, end 11 of wire 9 can be connected to any device that responds to the exertion of a force and various arrangements of a plurality of the trigger circuits can be designed to obtain, for example, desired inter-related mechanical movements.

While the invention has been shown and described with reference to a specific embodiment, it will be obvious to those skilled in the art that various changes and modifications can be made to this specific embodiment without departing from the spirit and scope of the invention as defined in the claims.

I claim:

1. A trigger circuit for heating a stretched wire to the temperature at which the wire restores to its original length, said wire having a memory such that when stretched, it remains stretched but restores to its original prestretched length when heated to the critical temperature of that wire, said wire exhibiting a contractible force toward its prestretched length when restoring to its prestretched length, said trigger circuit comprising:
    a transistor having a base electrode, an emitter electrode and a collector electrode;
    a length of wire having said memory and having a first end and a second end;
    means to couple said collector electrode to said length of wire adjacent said first end of said length of wire;
    a D.C. power supply having a first terminal and a second terminal;
    means to couple said first terminal of said D.C. power supply to said emitter electrode;
    means to couple said second terminal of said D.C. power supply to said length of wire adjacent said second end of said length of wire;
    switching means having a first stationary contact, a second stationary contact and a movable contact, said movable contact being movable from a neutral position to a first position when said movable contact is in electrical contact with said first stationary contact and to a second position when said movable contact is in electrical contact with said second stationary contact;
    chargeable means coupled between said movable contact and said first terminal of said D.C. power supply;
    means to couple said first stationary contact of such switching means to said second terminal of said D.C. power supply;
    means to couple said second stationary contact of said switching means to said base electrode; and
    resistance means coupled between said second stationary contact of said switching means and to the common point of said chargeable means and said first terminal of said D.C. power supply, said chargeable means being charged by said D.C. power supply when said switching means is in said first position and said chargeable means when charged rendering said transistor conductive for a given period of time to transmit a current pulse through said length of wire when said switching means is in said second position.

2. A trigger circuit as defined in claim 1 wherein said transistor is a high power transistor.

3. A trigger circuit as defined in claim 2 wherein said chargeable means is a capacitor.

4. A trigger circuit as defined in claim 3 wherein said resistance means is a variable resistor.

5. A trigger circuit as defined in claim 4 wherein said given period of time in which said transistor is rendered conductive is determined by the RC time constant of said capacitor and said variable resistor, said capacitor and said variable resistor being connected in parallel when said switching means is in said second position.

6. A trigger circuit as defined in claim 5 wherein said first end of said length of wire is secured.

7. A trigger circuit as defined in claim 6 wherein said second end of said length of wire is free, whereby said second end of said length of wire exerts a force toward said first end of said length of wire when said length of wire has been stretched and said transistor is rendered conductive, said length of wire restoring to its original unstretched length when said transistor is rendered conductive.

8. A trigger circuit as defined in claim 7 wherein said D.C. power supply is a battery.

9. A trigger circuit as defined in claim 8 wherein said length of wire is made of the alloy 55-Nitinol.

* * * * *